United States Patent [19]

Arai

[11] Patent Number: 4,585,910
[45] Date of Patent: Apr. 29, 1986

[54] HOOK DEVICE FOR LOCKING PANTOGRAPH

[75] Inventor: Hiroyuki Arai, Ebina, Japan

[73] Assignees: Toyo Kenki Zeizo Kabushiki Kaisha; Kabushiki Kaisha Komatsu Seisakusho, both of Tokyo, Japan

[21] Appl. No.: 561,037

[22] Filed: Dec. 13, 1983

[30] Foreign Application Priority Data

Dec. 16, 1982 [JP] Japan .................. 57-189211[U]

[51] Int. Cl.⁴ .......................... B60L 5/14; B60L 5/30
[52] U.S. Cl. ........................................ 191/90; 191/65
[58] Field of Search ............. 191/50, 65, 85, 90, 191/91

[56] References Cited

U.S. PATENT DOCUMENTS

| 879,267 | 2/1908 | Jackson | 191/90 X |
|---|---|---|---|
| 888,339 | 5/1908 | Macloskie | 191/90 X |
| 930,698 | 8/1909 | Self | 191/90 |
| 1,000,779 | 8/1911 | Case | 191/50 |
| 1,224,216 | 5/1917 | Schaake et al. | 191/65 |
| 1,400,101 | 12/1921 | Schaake | 191/65 |
| 1,682,432 | 8/1928 | Smith | 191/90 |

FOREIGN PATENT DOCUMENTS 2403170  7/1975  Fed. Rep. of Germany .
 760425 10/1956  United Kingdom .

Primary Examiner—Robert B. Reeves
Assistant Examiner—David F. Hubbuch
Attorney, Agent, or Firm—Stevens, Davis, Miller & Mosher

[57] ABSTRACT

A hook device for locking a pantograph comprising an air operating cylinder with a piston coupled to a piston rod. A hook is pivotally mounted on the piston rod and is controlled to engage with a portion of the pantograph under control of the pneumatic pressure and an engagement with a mechanical stopper. The device is useful for rigidly locking the pantograph a lowered position while retaining a shock absorbing clearance.

6 Claims, 5 Drawing Figures

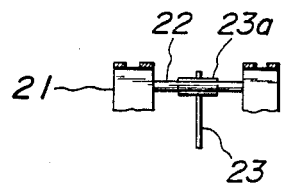
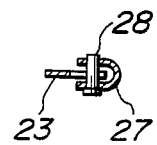
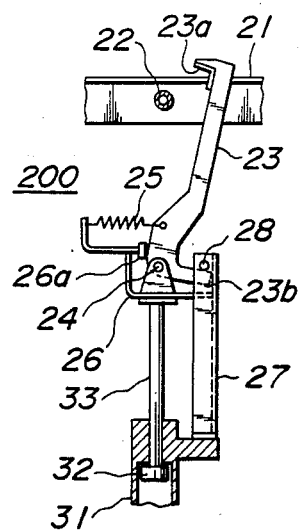

HOOK DEVICE FOR LOCKING PANTOGRAPH

BACKGROUND OF THE INVENTION (1) Field of the Invention

The present invention generally relates to electric motor drive vehicles using power supplied from a Diesel electric generator mounted on the vehicle and using electric power from an external source. The present invention specifically relates to a device for locking a pantograph on such a vehicle.

(2) Description of the Prior Art

In the abovementioned Diesel electric motor drive vehicle, a "trolley assist system" may be used depending upon the local requirements. This trolley assist system is used in order to save fuel costs and to improve driving characteristics. It may be used in locations where the vehicle goes up a steep slope. In the trolley assist system, an electric trolley wire is installed over a certain distance on the route and a pantograph mounted on the vehicle in order to collect the electric power for the trolley. The trolley motor is driven by the electric power supply from a base station and the Diesel generator electric source on the vehicle is cut off.

In such trolley assist systems, trouble is experienced in locking the pantograph when it is not in use outside the trolley assist zone. Here the vehicle is running using the vehicle mounted Diesel electric generator power source and the pantograph is folded down in the inoperative condition. The consequences of the inoperative position of the pantograph are dramatic when the vehicle is running on an extremely bad road such as mining transportation road through which the minerals are transported or in a newly developed off-road site. In such areas, the vehicle and folded pantograph are subjected to very strong vibrations or shocks.

When strong vibrations or shocks are applied to the vehicle, they are also transferred to the equipment mounted on the vehicle. This can cause serious trouble for the pantograph, which is usually made of light weight material to allow quick following against the trolley in the trolley assist zone. When the vehicle is running on the uneven ground where no trolley wire is installed and thus the pantograph is kept in the inoperative folded position, the hard shocks or vibrations may cause damage or breakage of the pantograph frame structure or to the pantograph current collector. Prior art locking systems have come unlatched during such shocks. In order to avoid such breakage, it is desirable that the pantograph frame structure and/or collector be locked rigidly and securely.

SUMMARY OF THE INVENTION

It is an object of the present invention to provide an improved pantograph locking device to be used on the vehicle equipped with a troley assist system. The present invention prevents unlocking of the folded pantograph while the vehicle is running on an uneven ground thus preventing breakage and damage of the pantograph frame structure and the collector caused by hard shocks or strong vibrations of the body of the vehicle.

BRIEF DESCRIPTION OF THE DRAWINGS

FIG. 3 is a cross-sectional view taken along line X—X of FIG. 2;

FIG. 4 is a cross-sectional view taken along line Y—Y of FIG. 2;

FIG. 5 is a different view of the device of the present invention for showing operation of the same.

DESCRIPTION OF THE PREFERRED EMBODIMENT

In order to clearly understand the present invention first a conventional pantograph and its associated locking device used on conventional electric trains will be explained briefly.

Figure 1:
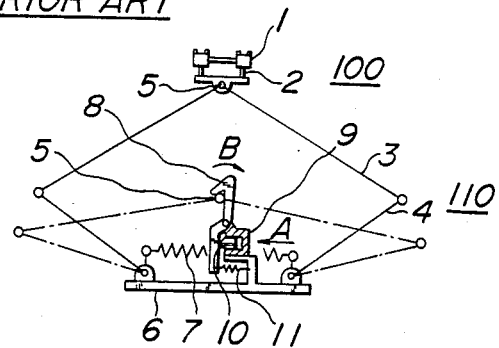
FIG. 1 is a simplified side view in partial cross-section of a pantograph locking device of a conventional type used in an electric train.

FIG. 1 is a conventional device for locking a folded pantograph 100 partially in cross-section.

FIG. 1 illustrates a pantograph collector 1, a support spring 2 of the collector, an upper frame structure 3, a lower frame structure 4, a top bar 5, a base frame 6, a main spring 7 for raising the pantograph, a hook lever 8, an air cylinder 9, a piston 10, and a tensile spring 11. The pantograph 100 generally consists of the above elements. The upper frame structure 3, the lower frame structure 4, and the top bar 5 together form a main frame structure 110.

In FIG. 1, a solid line indicates the operating or unfolded position of the pantograph 100. In this operating condition, the main frame structure 110 lifts up the pantograph collector 1 through the linear mechanism under the tensile force of the main spring 7. The pantograph collector 1 is further biased upwardly by the support spring 2.

Depending upon the extended position of the trolley wire (not shown) against which the pantograph collector 1 is pushed, the collector 1 follows the wire and adjusts position to achieve a continuous contact. To adjust for larger deviations of the trolley wire in the vertical direction, the collector moves vertically by the structure formed by the upper frame structure 3 and the lower frame structure 4 with the aid of the main spring 7. For small deviations of the trolley wire in the vertical position, the collector 1 follows the deviation only by the spring action of the support spring 2.

As can be seen from the dotted broken line in FIG. 1, the pantograph 100 may be folded down in the inoperative position. In this case, the top bar 5 is engaged by the hook 8. The hook 8 maintains its locking position by the pulling action of the tensile spring 11 and the top bar 5 is locked in the inoperative position.

When the pantograph 100 is to be raised to the operative position, a piston 10 in an air cylinder 9 is pushed out under high pressure iar in a direction of arrow A. The hook 8 is rotated in the direction of arrow B against the pulling force of a tensile spring 11. By this rotation the hook 8 is disengaged from the top bar 5 and the pantograph moves up into the operating position by the pulling force of the main spring 7. After the pantograph collector 1 comes in contact with the trolley wire, the abovementioned continuous contact is established.

In case of an electric train running on the rail, the range of vertical movement of the overhead trolley wire is comparatively small and the vertical shock or vibration applied against the vehicle from the rail is rather small so that the vertical movement of the pantograph collector 1 of the pantograph 100 is also small. For this reason, even a small stroke of the support spring 2 for the collector 1 ensures the proper operation.

Whereas in the trolley assist system, it is necessary for the vehicle to run over an uneven road surface such as mineral product carrying road or a road in a newly opened mining area. The pantograph 100, mounted on the vehicle in order to collect power from the trolley wire, must have good vertical flexibility. The main frame structure 110 of the pantograph 100 should be improved and the stroke of the support spring 2 is made large to allow a large vertical motion of the collector 1 to ensure a greater range while maintaining continuous contact.

When a Diesel electric power drive vehicle, mounted with the type of pantograph 100 which allows a large vertical deviation, is running over an uneven off-road zone with the pantograph 100 in the inoperative position, the top bar 5 of the main frame structure 110 is locked only by the conventional hook 8. A large shock or vibration applied to the vehicle from the uneven ground is simultaneously applied to the pantograph 100 and such a shock or vibration can cause the collector 1 and its supporting structure to be broken or damaged. Further there is a risk that the hook 8 may be disengaged from the top bar 5.

As has been mentioned in the foregoing, the present invention is to provide a device to safely and rigidly lock the whole structure of the pantograph 100 including the collector 1.

The invention will now be explained by referring to FIGS. 2 to 5.

As has been mentioned above, FIG. 2 is a partial side view for showing one embodiment of the present invention.

In the FIGS. 2 to 5, the reference numeral 21 designates a portion of the pantograph collector, which is supported by a supporting lever 22 forming a part of the frame mounting the pantograph collector. The supporting lever 22 can be locked by a hook 23 comprising a hook bar 23a at one end and a guide end bar 23b at the other end. This hook 23 is pivotally supported by a support pin 24 mounted on a hook base 26. The hook 23 is biased counterclockwisely by a tensile spring 25 and abuts against a stopper 26a of the hook base 26. The hook 23 can rotate about the pivot pin 24 on the hook base 26.

Figure 2:
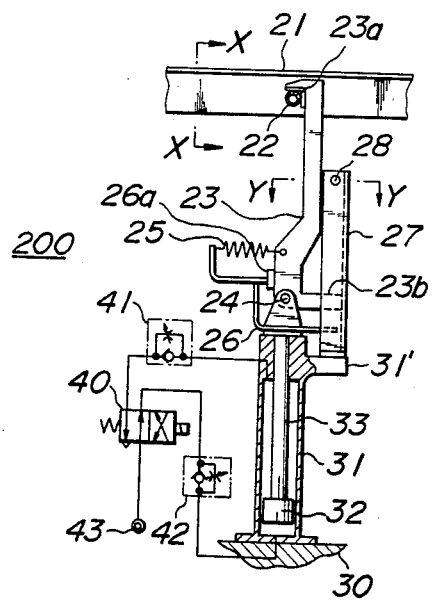
FIG. 2 is a side view in partial cross-section of a pantograph locking device according to the present invention.

In FIG. 2 reference numeral 30 designates base frame of the pantograph. On this base frame 30, an air cylinder 31 is mounted vertically. The air cylinder 31 houses a piston 32 having a piston rod 33 coupled thereto.

A guide plate 27 having U-shape cross-section is rigidly mounted on an upper support plate 31' of the air cylinder 31. A stopper pin 28 is fixed at top portion of the guide plate 27. This is also shown in FIG. 4.

On the top of the piston rod 33, the hook base 26 is coupled rigidly.

The hook base 26 having the hook 23 pivoted thereto and the guide end bar 23b held on the stopper 26a is guided for the vertical movement in the U-shape groove of the guide plate 27.

An electromagnetic valve 40 for feeding air to the air cylinder 31 is provided and a compressed air source 43 shown only schematically serves to feed the air under control of the electromagnetic valve 40 through pipe systems in which throttle valves 41 and 42 are interposed for controlling the moving speed of the piston 32.

As mentioned above, the hook device of the present invention, generally shown by the reference numeral 200, comprises the hook 23 having the hook bar 23a and the guide end bar 23b, the pivot pin 24, the tensile spring 25 for pulling the hook 23, the hook base 26, the guide plate 27 having stopper pin 28, the air cylinder 31 coupled with the piston 32 connected with the piston rod 33.

This hook device 200 may be mounted on the base frame 30 of the vehicle at a location not disturbing the movement of the pantograph at its operation. Furthermore, the hook device 200 may even be mounted at a side portion of the main frame structure 110 of the pantograph 100, when the position and construction of the supporting lever 22 of the pantograph 21 being engaged by the hook 23 are suitable. The direction of operation of the hook 23 is not limited in the forward direction of the vehicle. This may be arranged in a direction normal thereto and the hook operation is effected as same as that shown in the drawing as will be mentioned hereinafter.

The number of the hook device 200 is not limited to one per one pantograph, and a plural number of the devices may be provided to obtain a more steady locking.

FIGS. 2 to 4 show the condition where the supporting lever 22 of the pantograph collector 21 of a pantograph 100 is locked by the hook device 200. Whereas, FIG. 5 shows a the hook device 200 in the released position.

When the pantograph 100 is locked as shown in FIG. 2, the electromagnetic valve 40 may be energized to operate and introduce pressurized air from the pressurized air source 43 to the lower chamber of the air cylinder 31 via the throttle valve 42 and the pipe system, driving piston 32 upwardly. Accordingly the piston rod 33 and the hook base 26 connected thereto are also moved upwardly.

During this movement, the hook 23, which is pivotally mounted on the hook base 26 by the pin 24 and pulled by the tensile spring 25 fixed on the hook base 26, also moves upwardly. Towards the end of the upward movement, the guide end bar 23b of the hook 23 abuts against the stopper pin 28. At this point hook 23 rotates about the pin 24 in a clockwise direction and the hook bar 23a provided at the upper top end of the hook is moved away from the supporting lever 22 of the pantograph collector 21.

After release of supporting lever 22, the pantograph 100 moves the pantograph collector 21 upwardly. After it comes in contact with the trolley wire, the collector 21 is guided by the trolley wire and conducts the power supply current therefrom.

After the ascending movement of the pantograph 100, if the electromagnetic valve 40 is deenergized, the pressurized air is supplied from the pressure air source 43 in the upper chamber of the cylinder 31 via the electromagnetic valve 40 and the throttle valve 41, and acts to lower the piston 32. The hook 23 coupled to the piston rod 33 is also brought down to assume the original rest position indicated in FIG. 2. However, the pantograph collector 21 is in the ascended operative position.

When the pantograph 100 operating in the ascended position is to be lowered, the electromagnetic valve 40 is at first energized to bring the hook 23 upwardly to the position shown in FIG. 5 in which the hook 23 is in releasing position.

Then via a conventional control (not illustrated in the drawings), the tensile force of the main spring 7 of the pantograph 100 is counteracted and the pantograph 100 is lowered, allowing the main frame structure 110 to be folded.

In the above condition with the main frame structure 110 of the pantograph folded down, the electromagnetic valve 40 is deenergized to switch over the path of the pressurized air and to bring the air in the upper chamber of the cylinder 31 through the throttle valve 41, the piston 32 is lowered and the hook support base 26 connected to the piston rod 33 is also brought downwardly.

In this descending operation, when the guide end 23b is lowered below the stopper pin 28, the hook 23 returns the position to abut against the stopper 26a under the action of the tensile spring 25.

During further downward movement of the hook support base 26, the hook 23 is no longer restricted by the stopper pin 28 and rotates counterclockwise about the pivot pin 24 and engages supporting lever 22. At the lower bottom position of this piston rod 33, the hook 23 with the base 26 comes in contact with the air cylinder 31 or it may be said that the hook 23 is locked against the base frame 30 of the pantograph on which the air cylinder is fixed.

The supporting lever 22 of the pantograph collector 21 is rigidly engaged and locked by the hook 23 which is locked against the base frame 30 and abuts against the stopper 26a. In this condition, the compressed air system is controlled so as to apply air pressure downwardly on the piston 32 while leaving a small clearance of stroke below it. No substantial shock can be applied between the hook bar 23a and the supporting lever 22 of the pantograph collector 21. Therefore, the collector 21 is quite rigidly locked in the lowermost position.

As has been explained in the foregoing, by locking the supporting lever 22 of the pantograph collector 21 with some clearance stroke, the pantograph 100 is held quite rigidly. The clearance stroke allows for some shock absorption of pantograph movements. With the present invention, the pantograph can be locked rigidly even when the vehicle is running over unpaved bad roads and is subjected to strong shock and vibration, thus avoiding the undesired movement or vibration of the pantograph collector and the frame. This has the practical effect of preventing breakage or damage of the pantograph structures.

For an electric vehicle running on rails, the inventive hook device can also be used for locking the pantograph collector. In this case, the vertical height thereof in the folded position can be decreased by an amount corresponding to the vertical stroke of the piston rod 33. This results in a space saving in the overall size of the vehicle and affords an additional advantage in the construction of the pantograph.

What is claimed is:

1. A hook device for locking a pantograph mounted on a vehicle in a lowered, inoperative position by engaging a portion of said pantograph, said device comprising:
   a hook for releasably retaining said portion of said pantograph at least in said lowered position; and
   an air actuated piston means connected to said hook and having a stroke, for controllably raising and lowering said hook to raised and lowered positions, respectively, said air actuated piston means further comprising shock absorber means for minimizing shocks and vibrations applied to said hook by shocks and vibrations applied to said vehicle, said shock absorber means comprising means for maintaining a clearance in the stroke of said air actuated piston when said hook is in said lowered position, wherein said hook includes means for releasing said hook from engagement with said pantograph portion when said hook is in said raised position.

2. A hook device according to claim 1, wherein said hook is pivotably mounted for movement in a vertical plane and said means for releasing comprises a guide end extending generally horizontally from said hook and a stopper pin fixed with respect to said vehicle to abut said guide end during travel of said hook towards said raised position, whereupon further travel of said hook toward said raised position results in pivoting of said hook and release of said portion of said pantograph.

3. A hook device for locking a pantograph mounted on a vehicle in a lowered, inoperative position by engaging a portion of said pantograph, said device comprising:
   pantograph portion engaging means including a hook being mounted for movement in a vertical plane for releasably retaining said portion of said pantograph at least in said lowered position;
   means for controllably raising and lowering said engaging means to raised and lowered positions, respectively, wherein said raising and lowering means comprises an air actuated piston having a stroke and connected to said hook, and said air actuated piston further comprises shock absorber means for minimizing shocks and vibration applied to said hook by shocks and vibrations applied to said vehicle, and said shock absorber means comprising means for maintaining a clearance in the stroke of said air actuated piston when said hook is in said lowered position;
   further the engaging means includes means for releasing said hook from engagement with said pantograph portion when said hook is in said raised position.

4. A hook device according to claim 3, wherein said hook is pivotably mounted for movement in a vertical plane and said means for releasing comprises a guide end extending generally horizontally from said hook and a stopper pin fixed with respect to said vehicle to abut said guide end during travel of said engaging means toward said raised position, whereupon further travel of said engaging means toward said raised position results in pivoting of said hook and release of said portion of said pantograph.

5. A hook device according to claim 3, wherein said portion of said pantograph is a pantograph collector.

6. A hook device according to claim 5, wherein said pantograph collector is locked by the hook to keep the pantograph in a non-operative condition at lowered position of the engaging means.

* * * * *

UNITED STATES PATENT AND TRADEMARK OFFICE
CERTIFICATE OF CORRECTION

PATENT NO. : 4,585,910
DATED : 04/29/86
INVENTOR(S) : ARAI, Hiroyuki

It is certified that error appears in the above-identified patent and that said Letters Patent is hereby corrected as shown below:

ASSIGNEE: Toyo Denki Seizo Kabushiki Kaisha;
Kabushiki Kaisha Komatsu Seisakusho,
Tokyo, Japan Signed and Sealed this Nineteenth Day of August 1986

[SEAL]

Attest:

DONALD J. QUIGG

Attesting Officer

Commissioner of Patents and Trademarks